(12) United States Patent
Govande (10) Patent No.: US 10,511,564 B2
(45) Date of Patent: Dec. 17, 2019

(54) USER AVAILABILITY AWARE COMMUNICATION SYSTEM

(71) Applicant: salesforce.com, inc., San Francisco, CA (US)

(72) Inventor: Shailesh Govande, Milpitas, CA (US)

(73) Assignee: salesforce.com, inc., San Francisco, CA (US)

( * ) Notice: Subject to any disclaimer, the term of this patent is extended or adjusted under 35 U.S.C. 154(b) by 192 days.

(21) Appl. No.: 15/411,513

(22) Filed: Jan. 20, 2017

(65) Prior Publication Data

US 2018/0212920 A1 Jul. 26, 2018

(51) Int. Cl.
*G06F 15/16* (2006.01)
*H04L 12/58* (2006.01)
*H04L 29/08* (2006.01)
*H04W 4/12* (2009.01)

(52) U.S. Cl.
CPC .............. *H04L 51/36* (2013.01); *H04L 67/22* (2013.01); *H04L 67/24* (2013.01); *H04W 4/12* (2013.01)

(58) Field of Classification Search
USPC ........................................................ 709/206
See application file for complete search history.

(56) References Cited

U.S. PATENT DOCUMENTS

| | | | | | |
|---|---|---|---|---|---|
| 5,835,084 | A * | 11/1998 | Bailey | ............... | G06Q 10/107 715/783 |
| 5,958,006 | A * | 9/1999 | Eggleston | ............... | H04L 29/06 709/219 |
| 6,505,235 | B1 * | 1/2003 | Ogushi | ............... | G06Q 10/107 709/206 |
| 6,993,522 | B2 * | 1/2006 | Chen | ............... | G06F 16/27 |
| 6,999,469 | B1 * | 2/2006 | Chu | ............... | H04L 51/36 370/466 |
| 7,185,116 | B2 * | 2/2007 | Apfel | ............... | G06Q 10/107 709/203 |
| 7,305,069 | B1 * | 12/2007 | Day | ............... | H04M 3/53333 379/88.13 |
| 7,346,658 | B2 * | 3/2008 | Simpson | ............... | G06Q 40/04 379/13 |
| 7,509,382 | B1 * | 3/2009 | Jania | ............... | H04L 12/1831 709/206 |
| 7,512,659 | B2 * | 3/2009 | Keohane | ............... | H04L 51/04 709/206 |
| 7,596,210 | B2 * | 9/2009 | Blohm | ............... | H04M 3/42374 370/522 |
| 7,631,045 | B2 * | 12/2009 | Boerries | ............... | H04L 67/327 707/999.1 |
| 7,647,202 | B2 * | 1/2010 | Lamontagne | ............... | H02H 5/08 702/182 |

(Continued)

*Primary Examiner* — Alicia Baturay
(74) *Attorney, Agent, or Firm* — Kowert, Hood, Munyon, Rankin & Goetzel, P.C.

(57) ABSTRACT

This disclosure provides various techniques that may allow for user availability aware communication. For example, a first user may desire to send an electronic message to a second user, but may not have a way to intelligently select a messaging service to use. This disclosure provides, in one example of user availability aware messaging, that a particular messaging service may be selected based on activity information regarding the second user's activity on one or more messaging services. The electronic message may be sent to the second user via the particular messaging service.

14 Claims, 6 Drawing Sheets

(56) References Cited

U.S. PATENT DOCUMENTS

| | | | | |
|---|---|---|---|---|
| 7,664,814 | B2* | 2/2010 | Little, II | H04L 51/043 709/204 |
| 7,673,002 | B1* | 3/2010 | Damarla | G06Q 10/107 709/206 |
| 7,805,683 | B2* | 9/2010 | Sattler | G06Q 10/107 715/769 |
| 7,814,160 | B2* | 10/2010 | Burtner | H04L 51/00 709/202 |
| 7,865,557 | B2* | 1/2011 | Tomkow | G06Q 10/107 709/203 |
| 7,945,623 | B2* | 5/2011 | Simpson | G06Q 40/04 379/13 |
| 8,000,747 | B2* | 8/2011 | Zinn | H04M 1/274525 455/415 |
| 8,051,136 | B2* | 11/2011 | Dingler | H04L 65/1016 709/206 |
| 8,090,878 | B2* | 1/2012 | Pallipuram | G06F 16/273 709/248 |
| 8,161,107 | B2* | 4/2012 | Gregg | G06Q 10/107 709/204 |
| 8,233,604 | B2* | 7/2012 | Lei | H04L 67/24 379/201.02 |
| 8,347,317 | B1* | 1/2013 | Balaji | H04W 4/80 719/318 |
| 8,375,309 | B2* | 2/2013 | Fioretti | G06Q 10/10 715/753 |
| 8,375,400 | B2* | 2/2013 | Sutedja | G06Q 10/107 719/313 |
| 8,452,839 | B2* | 5/2013 | Heikes | H04L 51/02 709/206 |
| 8,516,060 | B2* | 8/2013 | Xie | G06Q 10/109 709/206 |
| 8,537,997 | B2* | 9/2013 | Gits | H04L 12/1813 370/260 |
| 8,539,361 | B2* | 9/2013 | Hardy | H04L 51/22 709/206 |
| 8,611,966 | B2* | 12/2013 | Zinn | H04M 1/274525 379/93.23 |
| 8,706,824 | B2* | 4/2014 | Davenport | H04L 51/14 709/204 |
| 8,761,737 | B2* | 6/2014 | Clarke | H04L 51/34 455/414.1 |
| 8,825,842 | B2* | 9/2014 | Papakipos | G06Q 10/10 709/224 |
| 8,825,962 | B1* | 9/2014 | Zhu | H04L 67/26 711/145 |
| 8,880,627 | B2* | 11/2014 | Davenport | H04L 51/36 709/204 |
| 8,942,366 | B2* | 1/2015 | Gits | H04L 12/1813 370/260 |
| 8,965,964 | B1* | 2/2015 | Odell | H04L 51/046 709/204 |
| 8,984,068 | B2* | 3/2015 | Bremner | G06Q 10/107 709/206 |
| 9,148,397 | B2* | 9/2015 | Talwar | H04L 51/38 |
| 9,158,559 | B2* | 10/2015 | Simmons | H04W 8/18 |
| 9,203,796 | B2* | 12/2015 | Hsiao | H04L 51/36 |
| 9,219,620 | B2* | 12/2015 | Nixon | G06Q 10/107 |
| 9,252,977 | B2* | 2/2016 | Levi | H04L 51/14 |
| 9,401,871 | B2* | 7/2016 | Gits | H04L 12/1813 |
| 9,449,103 | B2* | 9/2016 | Boland | G06F 16/9535 |
| 9,667,572 | B2* | 5/2017 | Heikes | H04L 51/02 |
| 2003/0023690 | A1* | 1/2003 | Lohtia | H04L 29/06 709/206 |
| 2004/0003042 | A1* | 1/2004 | Horvitz | G06Q 10/109 709/204 |
| 2004/0059791 | A1* | 3/2004 | Sherman | H04L 51/12 709/207 |
| 2005/0021650 | A1* | 1/2005 | Gusler | H04L 51/30 709/207 |
| 2006/0025164 | A1* | 2/2006 | Wang | H04L 51/04 455/466 |
| 2006/0053379 | A1* | 3/2006 | Henderson | G06F 3/0481 715/751 |
| 2006/0143277 | A1* | 6/2006 | Bauchot | H04L 29/1215 709/206 |
| 2007/0185961 | A1* | 8/2007 | Perlow | H04L 51/36 709/206 |
| 2008/0148148 | A1* | 6/2008 | Ramanathan | G06F 3/038 715/700 |
| 2008/0242370 | A1* | 10/2008 | Lando | H04L 51/04 455/574 |
| 2009/0049141 | A1* | 2/2009 | Jones | G06Q 10/107 709/206 |
| 2009/0070419 | A1* | 3/2009 | Gilfix | H04L 67/24 709/204 |
| 2009/0150507 | A1* | 6/2009 | Davis | H04L 51/14 709/207 |
| 2010/0017492 | A1* | 1/2010 | Reistad | G06Q 30/02 709/206 |
| 2010/0049815 | A1* | 2/2010 | Vanecek | G06Q 30/00 709/206 |
| 2010/0223341 | A1* | 9/2010 | Manolescu | H04L 51/32 709/206 |
| 2011/0119616 | A1* | 5/2011 | Suzuki | G06F 3/147 715/772 |
| 2011/0231499 | A1* | 9/2011 | Stovicek | H04M 1/72547 709/206 |
| 2011/0258264 | A1* | 10/2011 | Bremner | G06Q 10/107 709/206 |
| 2011/0271202 | A1* | 11/2011 | Wong | G06Q 10/10 715/752 |
| 2013/0007665 | A1* | 1/2013 | Chaudhri | H04L 51/24 715/830 |
| 2013/0159440 | A1* | 6/2013 | Appelman | G06F 9/542 709/206 |
| 2013/0318189 | A1* | 11/2013 | Klein | H04L 67/24 709/206 |
| 2013/0325922 | A1* | 12/2013 | Chaudhri | G06Q 10/10 709/203 |
| 2014/0149538 | A1* | 5/2014 | Deeter | H04L 67/26 709/217 |
| 2014/0201289 | A1* | 7/2014 | Wheeler | G06Q 10/107 709/206 |
| 2015/0019654 | A1* | 1/2015 | Wheeler | H04L 51/24 709/206 |
| 2017/0316320 | A1* | 11/2017 | Jamjoom | H04L 51/24 |

\* cited by examiner

USER AVAILABILITY AWARE COMMUNICATION SYSTEM

BACKGROUND

Technical Field

This disclosure relates to a communication system, and more particularly to a user availability aware communication system.

Description of the Related Art

Currently, when a user wants to send a message to an intended recipient, the user has to select a messaging service or platform (e.g., e-mail, short message service (SMS), etc.) to use to send the message. The case may arise that the selected messaging service may not be the best messaging service for contacting the intended recipient. Thus, a need exists to provide the ability for a user to intelligently select a messaging service to use to contact the intended recipient.

DETAILED DESCRIPTION

Many communication systems in use today are point to point. For example, a user who intends to send a message via email can use an email client to send only emails. In other words, the user cannot use the same email client to send the message via another messaging service or protocol (e.g., via short message service (SMS)). Similarly, the user must currently decide on the particular messaging service or protocol to use to send the message. For example, the user must designate that the message is to be sent via email, such as by inputting an email address in a "To" field of an email client. In some instances, the particular messaging service selected by the user may not be a better option to reach the intended recipient relative to other potential messaging services. For example, an intended recipient may not have access (or ready access) to the message delivered via the user-selected messaging service. The intended recipient may be away from his or her laptop and thus may not have access to his or her email. In such a scenario, if the user selected email as the messaging service to deliver the message, then the intended recipient may not be able to timely access the message.

Notably, the user may not have sufficient (or, in some instances, any) information to intelligently select a messaging service with which to contact an intended recipient. Similarly, there is no intelligence in current client systems or in the backend communication systems to select a messaging service from a plurality of messaging services. In this disclosure, a mechanism is described to allow a client system or a backend communication system to intelligently select a messaging service to use to deliver a message to an intended recipient.

It should be noted that various elements of this disclosure that are shown in the figures or described in the text may be used in conjunction with any of the computer systems, servers, mobile devices, other apparatuses, elements, or components disclosed herein or known in the art, among other systems. In various embodiments, some of the elements of process flows shown may be performed concurrently instead of sequentially, or in a different order than shown, or may even be omitted altogether in some cases. Additional process flow elements that are not shown may also be performed as appropriate or desired. In some embodiments, different elements of process flows may be performed by the same system or different systems.

One of ordinary skill in the art with the benefit of this disclosure will understand that various types of database or other storage technologies may be used in accordance with this disclosure. One of ordinary skill in the art with the benefit of this disclosure will also understand that the teachings herein are applicable to various types of situations in which a user availability aware communication system is a goal, and need not be limited to any specific situation described herein.

Figure 1:
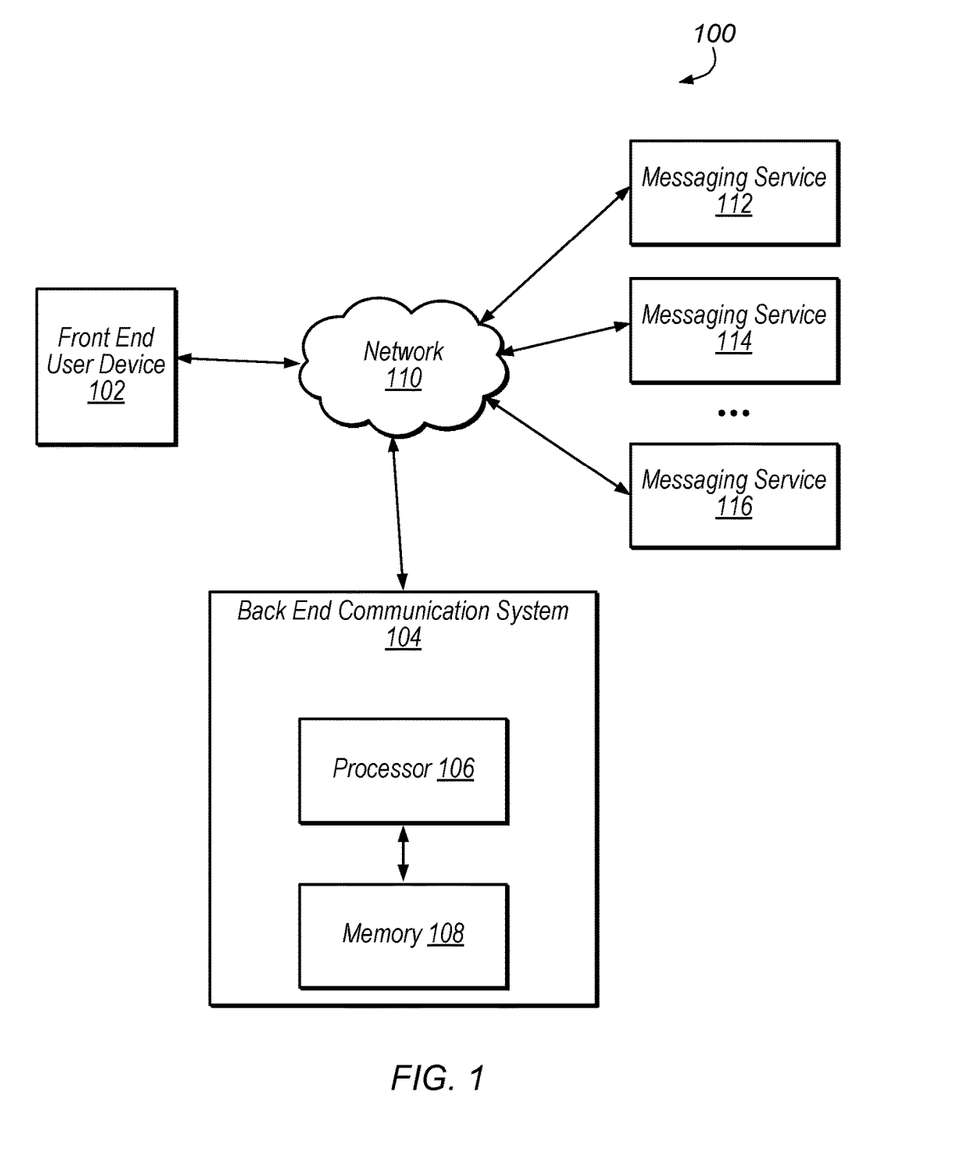
FIG. 1 is a block diagram illustrating an embodiment of this disclosure, according to some embodiments.

Turning now to FIG. 1, a block diagram of system 100 is shown. In system 100, front end user device 102 is operable to communicate with back end communication system 104 (e.g., via network 110) to send a message (e.g., an electronic message) to an intended recipient. An electronic message is any electronically delivered message sent from a user to a recipient, including but not limited to an email, a short message service (SMS) message, a text message, an instant message (IM), a fax, and the like. Front end user device 102 may include any suitable type of device (including, but not limited to, a personal computer system, desktop computer, laptop or notebook computer, mobile phone, mainframe computer system, web server, workstation, or network computer) configurable to run a messaging client or application (e.g., an email client). Network 110 may represent the Internet, an intranet, or any other suitable type of computer network.

Back end communication system 104 may communicate over network 110 with front end user device 102 and with a plurality of messaging services, such as messaging service 112, messaging service 114, and messaging service 116. Back end communication system 104 may be operable to determine a particular messaging service of the plurality of messaging services to use to send a message to an intended recipient, as explained in greater detail below. Back end communication system 104 may include one or more physical machines, which may include one or more computing devices, such as computing device 610 discussed in greater detail below with respect to FIG. 6. In the illustrated embodiment, back end communication system 104 includes processor 106 in communication with memory 108. Note that back end communication system 104 may include one or more processors 106 and one or more memories 108, in addition to other components (not shown in FIG. 1). Each processor 108 may be a multi-core processor including a plurality of cores. The processor cores may be capable of independently executing threads of a program (or threads from multiple programs) as assigned by an operating system, master control code, or other control software.

FIG. 1 also depicts a plurality of messaging services. Messaging services 112, 114, and 116 are shown in FIG. 1. Note, however, that back end communication system 104 may communicate with any number of messaging services and is not limited to the number of messaging services illustrated in FIG. 1. A messaging service is any service that allows the sending or receiving of messages. The messaging services (or messaging platforms or messaging protocols) may include social networking messaging platforms (e.g., WhatsApp, Facebook Messenger, Google Messenger, etc.) in addition to more traditional methods of electronic communication (e.g., email, short messaging service (SMS), etc.) and also services wherein the sending or receiving of messages is not a main feature of the service (e.g., sending/receiving a message via Waze, a traffic application). Note that the above distinction between social networking messaging platforms, traditional methods of electronic communication, and other services that include messaging may or may not be relevant to back end communication system 104. In other words, in determining which messaging service to use to reach the intended recipient, back end communication system 104 may not consider the above distinction, as explained in greater detail below.

Figure 2:
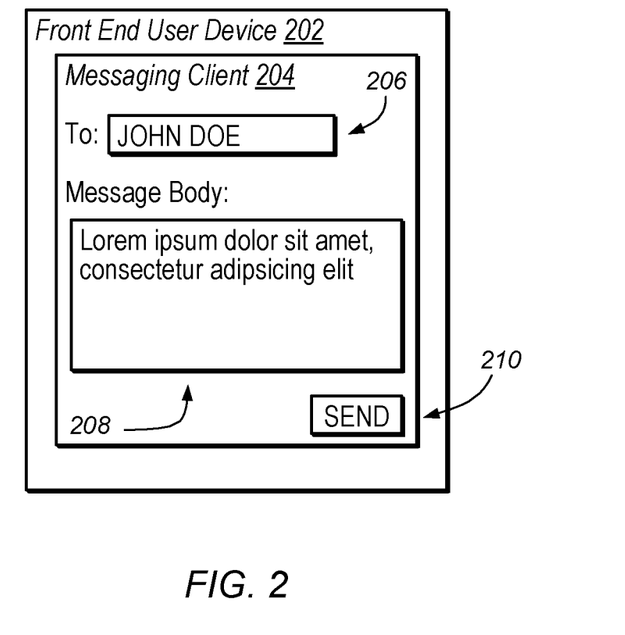
FIG. 2 shows an example of a front end user device, according to some embodiments.

Turning now to FIG. 2, an example of a front end user device 202 for allowing a user to send a message to an intended recipient via a selected messaging service, according to some embodiments, is shown. For example, the front end user device 102 may be used, in some embodiments. As illustrated in FIG. 2, front end user device 202 may include a messaging client 204. Messaging client 204 may be a messaging client associated with a particular messaging service (e.g., messaging client 204 may be an email client). Messaging client 204 may be any computer program or application that is configured to send and/or receive messages.

Messaging client 204 may include one or more fields configured to receive input from a user. For example, messaging client 204 may include "To" field 206, wherein the user indicates the intended recipient, and "Message Body" field 208, wherein the user includes the content of the message to be sent to the intended recipient. Note that messaging client 204 may include more fields other than the fields illustrated in FIG. 2 (i.e., "To" field 206 and "Message Body" field 208). Similarly, these fields may have labels that differ from those shown in FIG. 2. Notably, the information input into "To" field 206 may or may not indicate a particular messaging service to be used to deliver the message. In contrast to some prior art systems, the present communication system does not require the user to input an email address or a phone number or a handle that may be associated with a particular messaging service (note, however, that such information may be input into "To" field 206, wherein the input information may be used to identify the intended recipient). Rather, "To" field 206 indicates the intended recipient, who may be associated with one or more identifiers particular to one or more respective messaging services. In other words, the user may indicate the intended recipient in "To" field 206 with any identifier associated with the intended recipient (wherein the identifier may be a name, such as a full name, a user name, a handle, a nickname, initials, or the like, or the identifier may be information associated with a particular messaging service, such as an email address or a phone number). For example, as illustrated in FIG. 2, John Doe is indicated in "To" field 206. John Doe may be associated with a phone number (e.g., which may be used to send a SMS message), and email address (e.g., which may be used to send an email), and/or with one or more profiles and/or handles associated with other types of messaging service (e.g., John Doe may have a Facebook profile, which may be used to send a Facebook Messenger message). By allowing the user to indicate the intended recipient in "To" field 206, the present system may allow a particular messaging service to be intelligently determined by a back end communication system, as explained in greater detail below.

Messaging client 204 may include "Message Body" field 208. "Message Body" field 208 may include the content of the message to be sent to the intended recipient. The content of the message may include any content capable of being delivered to the intended recipient, including textual content, graphical content, audio content, video content, and the like. Messaging client 204 may include "Send" button 210. Responsive to the user activating "Send" button 210, messaging client 204 may transmit the message indicated in "Message Body" 208 to the intended recipient indicated in "To" field 206 via an intelligently determined messaging service, as explained below. Note that the functionality of initiating the sending of the message may be represented by a feature or protocol other than that represented by "Send" button 204, which is shown in FIG. 2 for illustrative purposes only. For example, the initiation of the sending of the message may be triggered by the user via some input that differs from the activation of "Send" button 204, such as by the user activing the "Enter" or "Return" key on an associated user input device.

Figure 3:
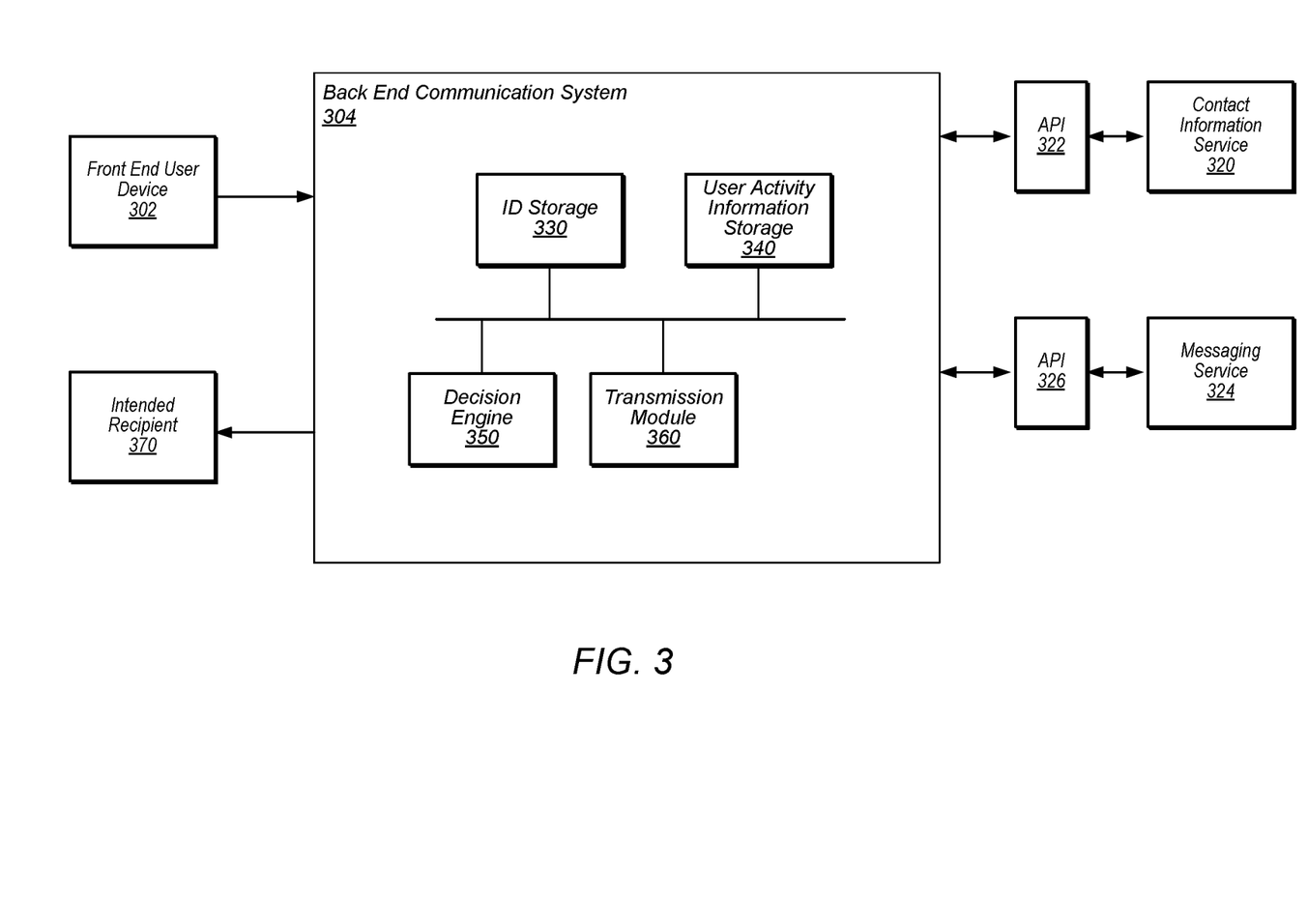
FIG. 3 is a block diagram illustrating an example of a back end communication system, according to some embodiments.

Turning now to FIG. 3, an example of a back end communication system 304 for determining a particular messaging service to use to send a message to an intended recipient is shown, according to some embodiments, is shown. For example, the back end communication system 104 may be used, in some embodiments. As illustrated in FIG. 3, back end communication system 304 may include ID storage module 330, user activity information storage module 340, decision engine 350, and transmission module 360.

Back end communication system 304 may receive a request (e.g., a request from a front end user device, such as front end user device 302) to send an electronic message to an intended recipient, such as intended recipient 370. The request may identify the intended recipient of the message (e.g., the request may indicate a name, phone number, email address, user name, handle, or any other identifier that indicates the intended recipient). Back end communication system may store contact information for one or more potential recipients in ID storage module 330 (e.g., in the form of a digital address book). Back end communication system 304 may determine whether contact information for the intended recipient is stored locally, such as in ID storage module 330. According to some embodiments, contact information for the intended recipient and/or for other potential recipients may be received from front end user device 302 and stored in ID storage 330. If information for the intended recipient is not stored locally (or if the contact information for the intended recipient is incomplete), back end communication system may query one or more contact information services, such as contact information service 320, to retrieve contact information for the intended recipient. According to some embodiments, the query for the contact information may be send via an API, such as API 322.

Back end communication system 304 may store user activity information for one or more potential recipients in user activity information storage 340. After receiving a request to send a message to an intended recipient, back end communication system may determine whether user activity information for the intended recipient is available, such as in user activity information storage module 340. If user activity information for the intended recipient is not available (or is incomplete or outdated), back end communication system 304 may query one or more messaging services, such as messaging service 324, to retrieve the user activity information for the intended recipient. According to some embodiments, the query for the user activity information may be send via an API, such as API 326.

Back end communication system 304 may determine a particular messaging service to use to deliver the message to the intended recipient based on the user activity information. Specifically, decision engine 350 may include one or more algorithms for evaluating each of a plurality of messaging services to select a particular one of the plurality of messaging services. For example, back end communication system 304 may use decision engine 350 to calculate a confidence number for each of the plurality of messaging services and to select the messaging service with the best confidence number, as explained in greater detail below. Once a particular messaging service has been selected, back end communication system may transmit the message to the intended recipient via transmission module 360.

Figure 4:
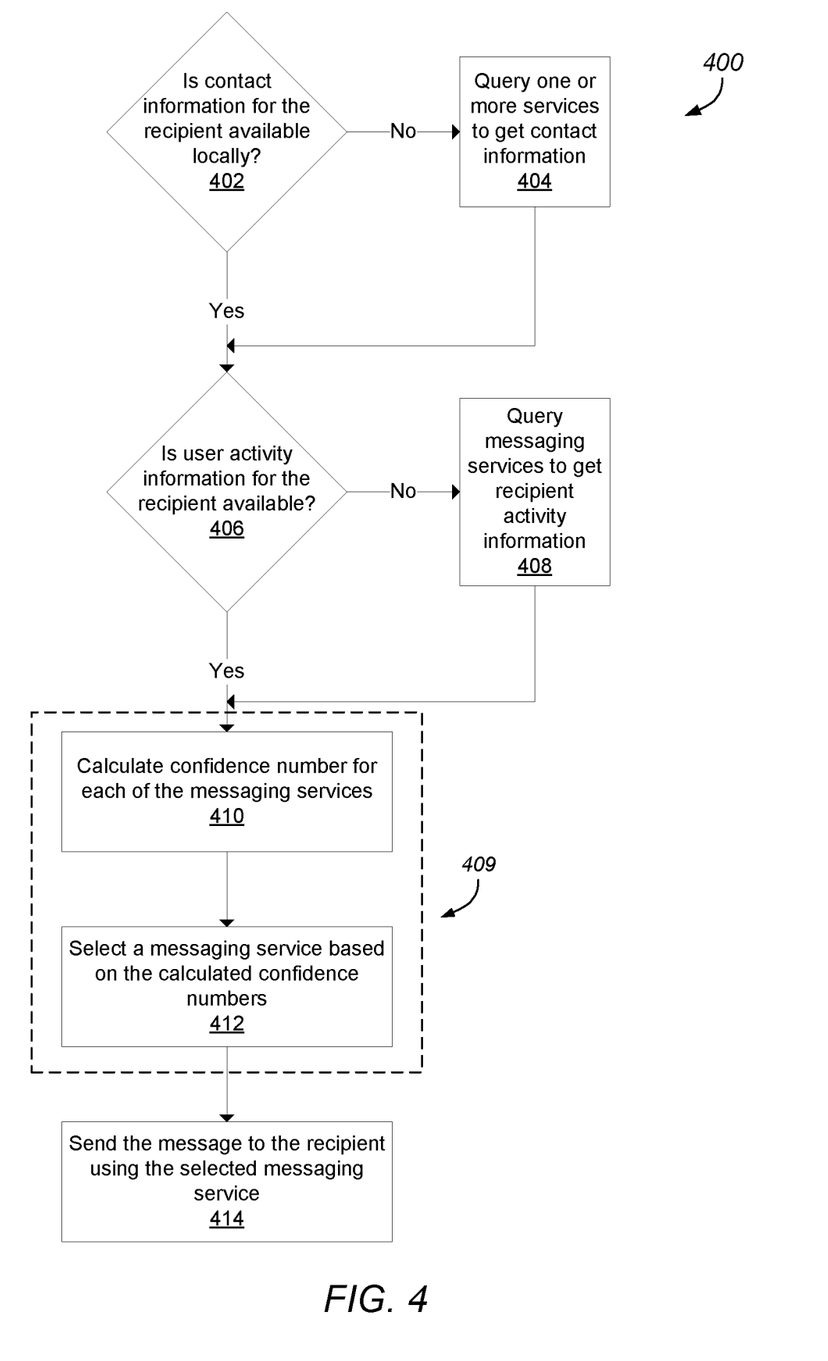
FIG. 4 is a process flow diagram, according to some embodiments.

FIG. 4 is a flowchart 400 illustrating a back end communication system intelligently determining a particular messaging service via which to send a message to an intended recipient, according to some embodiments. The embodiment illustrated in FIG. 4 may collect (or retrieve) user activity information associated with the intended recipient of the message from ones of a plurality of messaging services to intelligently select a particular one of the plurality of messaging services to use to transmit the message, as explained in greater detail below.

At 402, the back end communication system may determine whether contact information for the intended recipient of the message is available locally. For example, contact information for one or more potential message recipients may be stored locally by the front end user device and/or by the back end communication system (e.g., in memory 108, as illustrated in FIG. 1, and/or in ID storage 330, as illustrated in FIG. 3). For example, this contact information may be stored in the form of a digital address book, according to some embodiments. According to some embodiments, contact information for the intended recipient may be received from the front end user device. Each potential message recipient may be associated with one or more pieces of information collectively referred to as user contact information. For example, a potential message recipient may be associated with a phone number (e.g., useable to send a SMS message to the recipient), an email address (e.g., useable to send an email to the recipient), and/or a full name (e.g., useable to send a Facebook Messenger message to the recipient). According to some embodiments, step 402 may be performed responsive to the user indicating the intended recipient (e.g., responsive to the user inputting information into "To" field 206, as illustrated in FIG. 2). According to some embodiments, step 402 may be performed responsive to the user indicating the message to be sent (e.g., responsive to the user inputting information into "Message Body" field 208, as illustrated in FIG. 2). According to some embodiments, step 402 may be performed responsive to the user indicating an intent to send the message to the intended recipient (e.g., responsive to the user activing "Send" button 210, as illustrated in FIG. 2). If the back end communication system determines that contact information for the intended recipient is available locally, the back end communication system proceeds to 406.

Responsive to the back end communication system determining that contact information for the intended recipient is not available locally, the back end communication system, at 404, queries one or more services to obtain the contact information for the intended recipient. For example, the back end communication system may use an application programming interface (API) provided by a particular service to look up contact information associated with the intended recipient. For example, the back end communication system may use an API provided by a service such as LinkedIn, RocketReach, or the like. Similarly, the back end system may query a search engine (such as Google, Bing, Yahoo!, and the like) to retrieve user contact information. Such a service may provide the back end communication system with user contact information including the recipient's email address (or email addresses), name, title, employer, and/or one or more links to social network accounts associated with the intended recipient (e.g., Twitter, Google Plus, LinkedIn, Facebook, etc.). The back end communication system may store the received user contact information locally (e.g., in memory 108), according to some embodiments. After the back end communication system has received the user contact information from the one or more services, the back end communication system proceeds to 406.

At 406, the back end communication system determines whether user activity information for the intended recipient is available. For example, user activity information for the intended recipient may be stored locally by the back end communication system (e.g., in memory 108, as illustrated in FIG. 1, and/or in user activity information storage module 340, as illustrated in FIG. 3). The intended recipient may be associated with one or more pieces of information collectively referred to as user activity information. User activity information is information that describes a user's engagement or interaction with a messaging service. The back end communication system may use this user activity information as factors in determining a particular messaging service to use to send the message to the intended recipient. User activity information may include a time the intended recipient was last seen on a messaging service (e.g., the time at which the intended recipient most recently engaged with the messaging service). User activity information may include a number of times the intended recipient has accessed the messaging service within a particular time frame (e.g., 1 minute, 1 hour, 1 day, etc.). Note that even when user activity information for the particular user is stored locally, the back end communication system may determine whether the information is sufficiently current. For example, if the information is older than a threshold time (e.g., older than 1 minute, 1 hour, 1 day, etc.), the back end communication system may determine that user activity information for the intended recipient should be refreshed. If the back end communication system determines that user activity information for the intended recipient is available, the back end communication system proceeds to 410.

Responsive to the back end communication system determining that user activity information for the intended recipient is not available, the back end communication system, at 408, queries the plurality of messaging services to obtain user activity information. After the back end communication system has received the user activity information from ones of the plurality of messaging services, the back end communication system proceeds to 410. Note that the steps indicated by box 409 are one embodiment for selecting a particular messaging service. Other embodiments are also contemplated by the present disclosure, as explained in greater detail below.

At 410, the back end communication system calculates a metric (e.g., a confidence number) for each of the plurality of messaging services. The metric, such as a confidence number, may indicate the relative confidence in reaching the intended recipient in a timely manner. In other words, the confidence number indicates a relative strength of reaching the intended recipient for each messaging service when evaluated given the user activity information for the intended recipient. An example of an algorithm for calculating a confidence number is shown below in Eq. 1.

$$\text{Confidence} = \text{ABS}\left(\text{Current Timestamp} - \left(\text{Last Seen Timestamp} + \frac{\text{Time Frame}}{\text{Times Seen}}\right)\right) \quad \text{(Eq. 1)}$$

A confidence number may be calculated for each of the plurality of messaging services using the equation shown in Eq. 1. As presented, "ABS" is the absolute value function, "Current Timestamp" is the time stamp associated with when the user intends to send the message to the intended recipient (e.g., a time stamp associated with activation of "Send" button 210, as illustrated in FIG. 2). "Last Seen Timestamp" is the time stamp associated with the intended recipient's last engagement with the messaging service. "Time Frame" is the pre-determined time frame for assessing the frequency with which the intended recipient engaged with the messaging service (e.g., 1 minute, 1 hour, 1 day, etc.). "Times Seen" is the number of times the intended recipient engaged with the messaging service in the amount of time expressed in the "Time Frame."

After the back end messaging system has calculated a confidence number for each of the messaging service, the back end messaging system, at 412, selects a particular messaging service from the plurality of messaging services to use to send the message to the intended recipient. The selection of the particular messaging service may be based on the confidence numbers calculated at 410. For example, if the confidence number is calculated according to Eq. 1, the back end messaging system may select the messaging service that has the lowest absolute value given by the output of Eq. 1.

According to some embodiments, the back end communication system may use other factors in addition to the confidence number in selecting the particular messaging service to use. For example, the back end communication system may determine a priority rating for the message. The priority rating may be estimated by the back end communication system and/or by the front end user device (e.g., based on an analysis of the content of the message) and/or may be indicated by the user (e.g., by selecting a priority rating on a scale of potential ratings, such as low, medium, and high, among others). According to some embodiments, an analysis of the content of the message may include a word search and/or an analysis of grammar, syntax, and/or punctuation in order to estimate the priority of the message. If the back end communication system or the front end user device determines that the message has a high priority, the back end communication system may select the particular messaging service based on the confidence number. If the back end communication system or the front end user device determines that the message has a low (or medium) priority, the back end communication system may use a default messaging service (e.g., the default may be determined by the back end communication system, such as by using the most frequently used messaging service, or may be indicated by the user). In other words, a determination of a low priority message may bypass (or ignore) the calculated confidence numbers associated with each of the plurality of messaging services.

Figure 5:
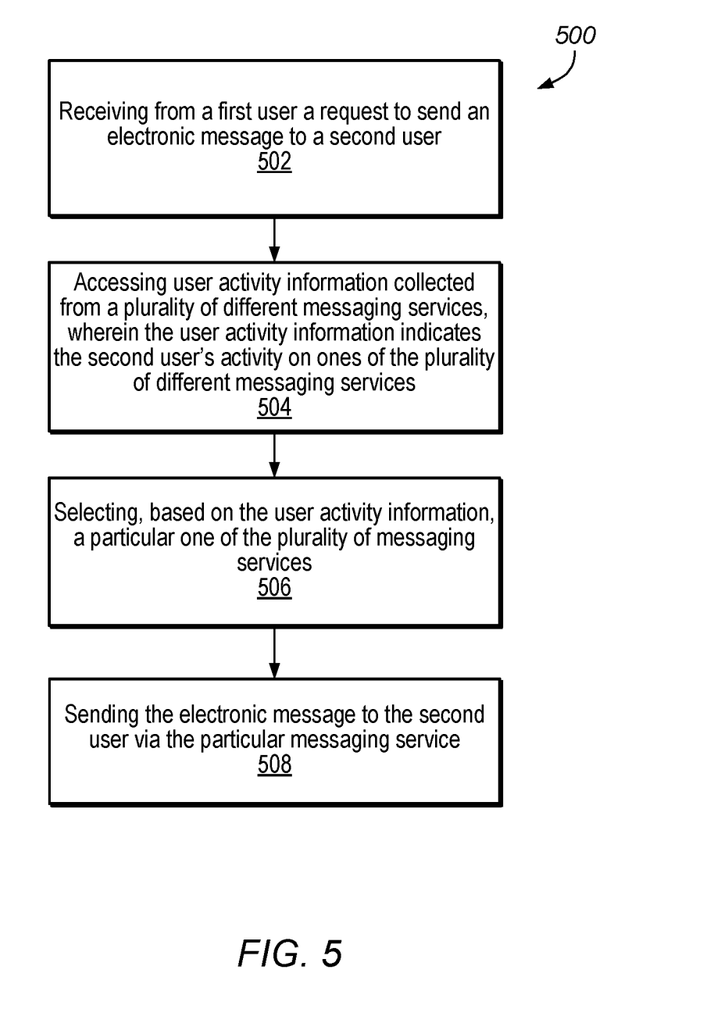
FIG. 5 is a process flow diagram, according to some embodiments.

FIG. 5 is a flowchart 500 illustrating one embodiment of certain techniques described herein. While the blocks are shown in a particular order for ease of understanding, other orders may be used. Blocks, combinations of blocks, and/or the flowchart 500 as a whole may be performed in parallel.

A request to send an electronic message to an intended recipient may be received from a first user (block 502). User activity information associated with the intended recipient (i.e., a second user) from a plurality of different messaging services may be accessed (block 504). The user activity information may indicate the second user's activity on ones of the plurality of different messaging services. A particular one of the plurality of messaging services may be selected based on the user activity information (block 506). The electronic message may be sent to the second user via the particular messaging service (block 508).

For the purposes of illustration, an example use case of the present concepts is disclosed herein. A first user may wish to send a message to an intended recipient (e.g., a second user). The first user may access a messaging client (e.g., on the user's user device) and indicate the intended recipient and the message content in respective input fields of the messaging client. A back end communication system may receive an indication that the first user intends to send a message to the intended recipient (e.g., the user indicating the intended recipient in the "To" field of the messaging client may trigger the sending of an indication from the front end user device to the back end communication system). The back end communication system may determine whether contact information for the intended recipient is stored locally by the user device and/or by the back end communication system. If contact information for the intended recipient is not stored locally, the back end communication system may query one or more services (e.g., via an API provided by the one or more services and/or via a query sent to the service) to retrieve the contact information for the intended recipient.

After retrieving the contact information, the back end communication system may determine whether user activity information is available for the intended recipient. If user activity information for the intended recipient is not available, the back end communication system may query a plurality of messaging services to retrieve the user activity information for the intended recipient. Based on the retrieved user activity information, the back end communication system may calculate a confidence number for each of the plurality of messaging services (or for each of the plurality of messaging services for which the back end communication system received user activity information) useable to select a particular one of the plurality of messaging services to deliver the message. For example, the user activity information may indicate that the intended recipient was last active on a particular messaging service recently (e.g., the intended recipient was last active on WhatsApp approximately 1 minute ago) and/or may indicate that the intended recipient frequently used a particular messaging service (e.g., the intended recipient used WhatsApp ten times in the past hour). This particular user activity information may indicate that WhatsApp has the best confidence number (e.g., according to Eq. 1) relative to the confidence numbers of others of the plurality of messaging services. The back end communication system may route the message to the intended recipient via the particular messaging service (e.g., via WhatsApp).

Figure 6:
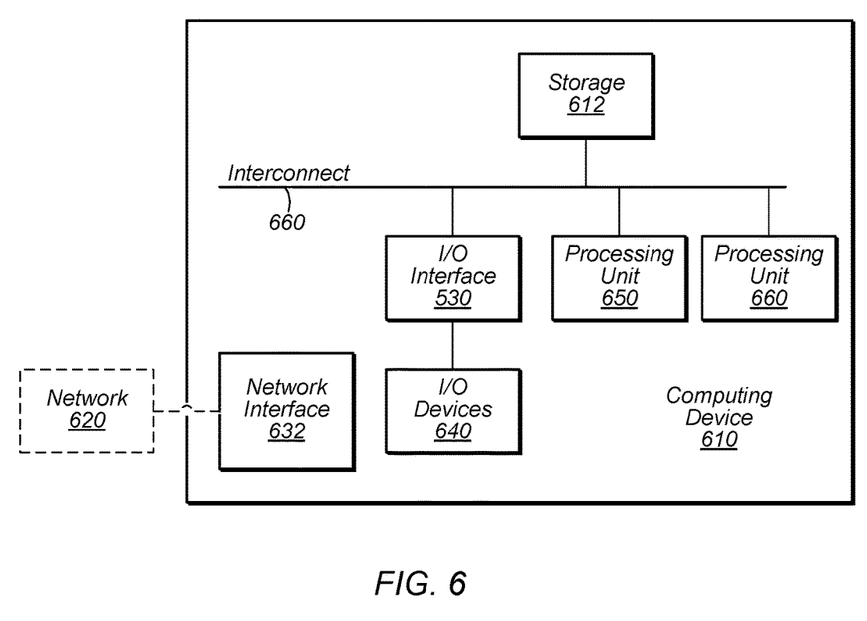
FIG. 6 is a block diagram illustrating a computing system, according to some embodiments.

Turning now to FIG. 6, a block diagram of a computing device (which may also be referred to as a computing system) 610 is depicted, according to some embodiments. Computing device 610 may be used to implement various portions of this disclosure. Computing device 610 is one example of a device that may be used as a mobile device, a server computing system, or any other computing system implementing portions of this disclosure.

Computing device 610 may be any suitable type of device, including, but not limited to, a personal computer system, desktop computer, laptop or notebook computer, mobile phone, mainframe computer system, web server, workstation, or network computer. As shown, computing device 610 includes processing unit 650, storage subsystem 612, input/output (I/O) interface 630 coupled via interconnect 660 (e.g., a system bus). I/O interface 630 may be coupled to one or more I/O devices 640. Computing device 610 further includes network interface 632, which may be coupled to network 620 for communications with, for example, other computing devices.

As described above, processing unit 650 includes one or more processors such as the processor 106 in FIG. 1. In some embodiments, processing unit 650 includes one or more coprocessor units. In some embodiments, multiple instances of processing unit 650 may be coupled to interconnect 660. Processing unit 650 (or each processor within processing unit 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory in some embodiments. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In some embodiments, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"Based On." As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure (even where only a single embodiment is described with respect to a particular feature). Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although some example embodiments are described as providing various advantages, any particular embodiment according to this disclosure may provide some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   storing, by a computer system, contact information for one or more users, wherein the contact information is indicative of an association with a plurality of different messaging services;
   receiving, from a first user by the computer system, a request to send an electronic message to a second user;
   accessing, by the computer system, user activity information collected from the plurality of different messaging services, wherein the user activity information indicates the second user's activity on ones of the plurality of different messaging services, and wherein the user activity information specifies for a given messaging service:
      a last engagement time indicative of when the second user last engaged with the given messaging service; and
      a frequency value indicative of a number of times that the second user has engaged with the given messaging service within a given time period;
   determining, by the computer system based on the user activity information, a score for each of the plurality of different messaging services, wherein the score for the given messaging service is determined by:
      adjusting the last engagement time based on the frequency value; and
      computing a difference between a time at which the electronic message is to be sent and the adjusted last engagement time;
   selecting, by the computer system based on the score for each different messaging service, a particular one of the plurality of messaging services; and
   sending, by the computer system, the electronic message to the second user via the particular messaging service.

2. The method of claim 1, wherein the request to send the electronic message includes an identifier associated with the second user that is particular to a first messaging service of the plurality of different messaging services.

3. The method of claim 2, wherein the particular messaging service is a messaging service other than the first messaging service.

4. The method of claim 3, further comprising querying, by the computer system responsive to determining that contact information for the second user is not available locally, one or more services to obtain the contact information for the second user.

5. A system, comprising:
   a processor; and
   a memory coupled to processor, wherein the memory has computer instructions stored thereon that are capable of being executed by the system to cause operations comprising:
      receiving a request from a first user to send an electronic message to a second user;
      accessing user activity information collected from a plurality of different messaging services, wherein the user activity information indicates the second user's activity on ones of the plurality of different messaging services, wherein accessing the user activity information includes querying the plurality of different messaging services to receive the user activity information, and wherein the user activity information specifies for a given one of the plurality of different messaging services:
         a last engagement time indicative of when the second user last engaged with the given messaging service; and
         a frequency value indicative of a number of times that the second user has engaged with the given messaging service within a given time period;
      calculating, based on the user activity information, a metric for each of the plurality of different messaging services, wherein the metric for the given messaging service is calculated by:
      adjusting the last engagement time based on the frequency value; and
      computing a difference between a time at which the electronic message is to be sent and the adjusted last engagement time;
      selecting, based on the metric for each different messaging service, a particular one of the plurality of messaging services; and
      sending the electronic message to the second user via the particular messaging service.

6. The system of claim 5, wherein the particular messaging service is selected based on the particular messaging service having the highest metric of the plurality of messaging services.

7. The system of claim 5, wherein the operations further comprise querying one or more services for contact information for the second user responsive to determining that the contact information for the second user is not available locally.

8. The system of claim 7, wherein the determining that the contact information for the contact information for the second user is not available locally is performed responsive to the first user indicating an identity of the second user.

9. A non-transitory computer-readable medium having computer instructions stored thereon that are capable of being executed by a computer system to cause operations comprising:
   storing contact information for one or more users, wherein the contact information is indicative of an association with a plurality of different messaging services;
   receiving a request from a first user to send an electronic message to a second user;
   accessing user activity information collected from the plurality of different messaging services, wherein the user activity information indicates the second user's activity on ones of the plurality of different messaging services, and wherein the user activity information specifies for a given one of the plurality of different messaging services:

a last engagement time indicative of when the second user last engaged with the given messaging service; and a frequency value indicative of a number of times that the second user has engaged with the given messaging service within a given time period;

determining, based on the user activity information, a score for each of the plurality of messaging services, wherein the score for the given messaging service is determined by:

adjusting the last engagement time based on the frequency value; and computing a difference between a time at which the electronic message is to be sent and the adjusted last engagement time;

selecting, based on the determined score for messaging service, a particular one of the plurality of messaging services; and sending the electronic message to the second user via the particular messaging service.

10. The non-transitory computer-readable medium of claim 9, wherein the operations further comprise determining whether contact information for the second user is available locally.

11. The non-transitory computer-readable medium of claim 10, wherein the operations further comprise querying one or more services to obtain the contact information for the second user responsive to determining that the contact information for the second user is not available locally.

12. The non-transitory computer-readable medium of claim 11, wherein the querying the one or more services includes sending a request for the contact information for the second user via a respective application programming interface for the one or more services.

13. The non-transitory computer-readable medium of claim 9, wherein the operations further comprise determining a priority rating for the electronic message based on content of the electronic message.

14. The non-transitory computer-readable medium of claim 13, wherein the selecting is further based on the priority rating for the electronic message.

* * * * *